United States Patent
Demma (10) Patent No.: US 6,208,134 B1
(45) Date of Patent: Mar. 27, 2001

(54) INTERFERENCE-TOLERANT PROXIMITY SENSOR SYSTEM HAVING A RESONANCE-TRACKING IMPEDANCE ANALYZER

(75) Inventor: Nick Anthony Demma, Minneapolis, MN (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 09/407,178

(22) Filed: Sep. 30, 1999

(51) Int. Cl.[7] ....................................................... G01B 7/14
(52) U.S. Cl. ................ 324/207.26; 324/236; 324/207.12
(58) Field of Search .......................... 324/207.12, 207.15, 324/207.16, 207.17, 207.24, 207.25, 207.26, 236, 652, 655, 658, 675, 682; 331/65; 361/179–181

(56) References Cited

U.S. PATENT DOCUMENTS

| | | | |
|---|---|---|---|
| 4,001,718 | * 1/1977 | Wilson et al. | 331/186 |
| 4,187,462 | * 2/1980 | Haker et al. | 324/236 |
| 5,420,507 | * 5/1995 | Laskowski | 324/236 |
| 5,767,672 | * 6/1998 | Guichard et al. | 324/207.26 |

* cited by examiner

*Primary Examiner*—Jay Patidar
(74) *Attorney, Agent, or Firm*—John G. Shuay Jr.

(57) ABSTRACT

A system to analyze the impedance of interference-tolerant proximity sensors. A lock-in amplifier (LIA) is implemented as a resonance-tracking oscillator. The control loop of the amplifier monitors the response of sensor in relation to the output of a local oscillator to adjust the oscillator's frequency to resonance. The nature of the sensor acts as a pre-filter of noise for a synchronous demodulator, which demodulates the sensor's response with the local oscillator's driving signal. The output of the system is a filtered version of this demodulated signal. This system is effective in sensing objects in the presence of electromagnetic noise that is many times stronger than the signal produced by the local oscillator.

21 Claims, 9 Drawing Sheets

INTERFERENCE-TOLERANT PROXIMITY SENSOR SYSTEM HAVING A RESONANCE-TRACKING IMPEDANCE ANALYZER

BACKGROUND

The invention pertains to proximity sensor systems. Particularly, it pertains to sensor systems which analyze the impedance of their resonators, and more particularly to such systems in which analyzers eliminate the effects of high levels of electromagnetic interference (EMI) in the sensors' environments.

A class of non-radiating proximity sensors and the associated detection systems rely on inductive properties and rely on the principle that their effective inductance changes in proportion to a conducting object's position.

A common and well-known detection method for this class of sensors is the eddy-current killed oscillator. In this system a circuit, including an inductor in the sensor, is in resonance when there is no detectable object near the sensor. When a detectable object is sufficiently close to the sensor, the change in the effective loss of the inductor in the sensor defeats resonance and thus causes the oscillations in the circuit to cease. If the inductance changes, the resonator may change frequency without quenching the oscillations. It is the change in the loss that spoils the resonance and stops the oscillation. The related-art approach is inadequate for environments with high electromagnetic interference.

The present invention circumvents this problem by utilizing in a particular way the principles of AM radio, without radiating an AM signal, as well as of resonance tracking, namely synchronous demodulation, to analyze the impedances of proximity sensors. The resonance tracking circuit in this invention never stops because the sensor is being driven with a generated waveform, but the change in loss causes the amplitude of the signal to change and ultimately causes the output to change due to the change in amplitude.

SUMMARY OF THE INVENTION

This invention is an electronic system associated with a proximity sensor (e.g., a railcar wheel sensor) that measures the impedance of the sensor in the presence of high levels of electromagnetic interference (e.g., 75 times that of the signal being sensed). Such interference causes related-art proximity sensor systems to malfunction.

The sensor, having an inductor and capacitor in parallel (i.e., a resonant circuit), is excited by a voltage-to-current converter. The converter is fed with a signal from a voltage-controlled triangle-wave oscillator (VCO) in the present circuit and the sensor changes the output signal into a sine wave. These electronics are receptive to interfering electromagnetic signal source or noise. A voltage amplifier senses the voltage at the resonant sensor. The sensed voltage is demodulated with a shifted version of the signal going into the converter. The result is filtered and fed back through an integrator, which integrates the error signal. This integrated voltage signal goes to the VCO and ensures that the VCO is at the resonant frequency of the sensor.

When the VCO is oscillating at the resonant frequency of the sensor, the input to the integrator has no DC component so that the output of the integrator is not changing. This output therefore remains at the level needed to keep the VCO running at the resonant frequency of the sensor. When it is not at the resonant frequency, there is a DC component at the input of the integrator, so the output of the integrator moves to a new level to adjust the frequency of the VCO. The output of the integrator stabilizes when the resonant condition is established. Thus, the VCO is maintained at the resonant frequency of the sensor.

The output of the proximity sensor system is a single, DC signal. This is produced by demodulating the signal from the resonant sensor, using the signal from the oscillator, and filtering out the interfering signals from it. The demodulating signal, the one from the oscillator, is synchronized with the signal to be demodulated, the one from the sensor, since they both have the same source, the oscillator. The filtering is commonly done before the demodulation, but in this design it is done afterward. At the same time, the resonant sensor itself acts as a band pass filter to also attenuate some of the interference before demodulation.

The oscillator with in-phase and quadrature outputs, the feedback paths via the voltage-to-current converter or amplifier, the demodulator and the low-pass filter implement a lock-in amplifier (LIA). This is an amplifier that seeks a signal at a specific frequency to amplify. In this case, it is the frequency of the VCO, which tracks the resonance frequency of the proximity sensor. The impedance, and therefore the resonant frequency, changes in the presence of a metal object proximate to the sensor, thus sensing the object.

This approach is effective for two reasons. First, the design implements a lock-in-amplifier that translates the frequency of interest to DC before filtering out extraneous signals using a multiple-pole (i.e., third order) low pass filter. In the present invention, the sensor's resonant frequency is around 400 kHz and the dominant source of interference is around 165 kHz, so the interference to be rejected is more than 200 kHz away from the sensor's resonant frequency and the third order 300 Hz low-pass filter provides over 100 dB of rejection of the interference.

The second reason for the system's effectiveness is that the resonator or sensor itself implements a pre-filter, and the controlling electronics assures that the filter is centered on the signal. A common technique in lock-in amplification is to pre-filter the signal by putting a band-pass filter in front of the demodulator, but this is not necessary since here the sensor itself acts as a band-pass filter. This combination of the pre-filter and synchronous demodulator is used to recover signals that are buried in broadband noise that is hundreds of times larger than the signals. The use of lock-in-amplification in conjunction with the present resonance-tracking control electronics is an unusual and effective solution to the problem of electromagnetic interference. The present sensor is very robust in very noisy EMI environments (i.e., noise-to-signal ratios greater than 75 times).

DESCRIPTION OF THE EMBODIMENTS

Figure 1:
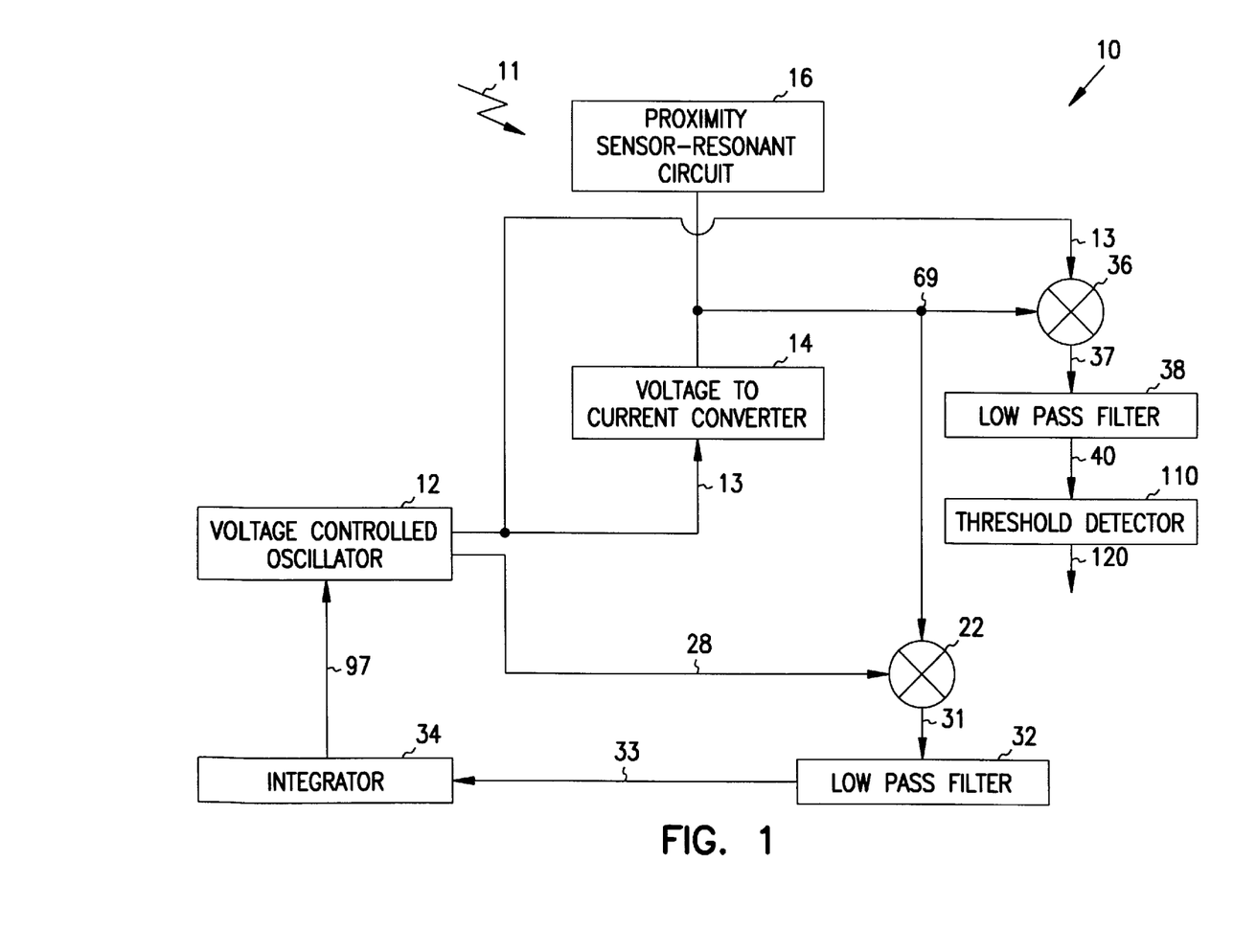
FIG. 1 is a block diagram of the present invention.

FIG. 1 shows the block diagram for an interference-tolerant proximity sensor system 10 having a resonance-tracking impedance analyzer. Each block represents an electronic circuit or a separate function. At the core of the system is a voltage controlled oscillator (VCO) 12, an oscillator that allows its frequency to be controlled by an external voltage input from within system 10.

EMI signals 11 penetrate the electronics. Interfering signals 11 are often present in the inductive coil 66 of proximity sensor 16. The outputs of VCO 12 include a triangular wave 13 and a 90-degree shifted square wave 28. Signal 13 goes to a voltage-to-current converter 14 and to multiplier or demodulator 36, and signal 28 goes to multiplier or demodulator 22. Voltage-to-current converter 14 drives sensor 16 with a high-impedance current pump in converter 14. The present application involves sensor system 10 in an environment of interfering signals 11 below 200 kHz. The 400 kHz is chosen as the operating frequency, that is, the resonant frequency of sensor 16 in this preferred embodiment.

Sensor 16 itself can take many forms. However, it has the features of an inductor 66 and capacitor 67 to provide a resonant frequency suitable for integration with the rest of system 10, and such that the impedance of the sensor is affected when a detectable object is in a position to be detected. Sensor 16 also can act as a band-pass filter to attenuate interfering signals 11.

If VCO 12 is running at the resonance frequency of sensor 16, the oscillator's output 13 is 180 degrees out of phase with output 69 of sensor 16. A separate buffer amplifier may receive signal 69 to amplify it prior to sending it to demodulators 22 and 36. The demodulators have a high bandwidth (much higher than 400 kHz) and a buffer amplifier (if it were used) would have to have a very much higher bandwidth to avoid phase shifting the signal at 400 kHz because such phase shift would cause an error in estimating the frequency of the resonance. The output of that amplifier would go to demodulators or multipliers 22 and 36, respectively. The present embodiment is designed without a need for a separate buffer amplifier because the demodulators have high input impedances.

Figure 2A:
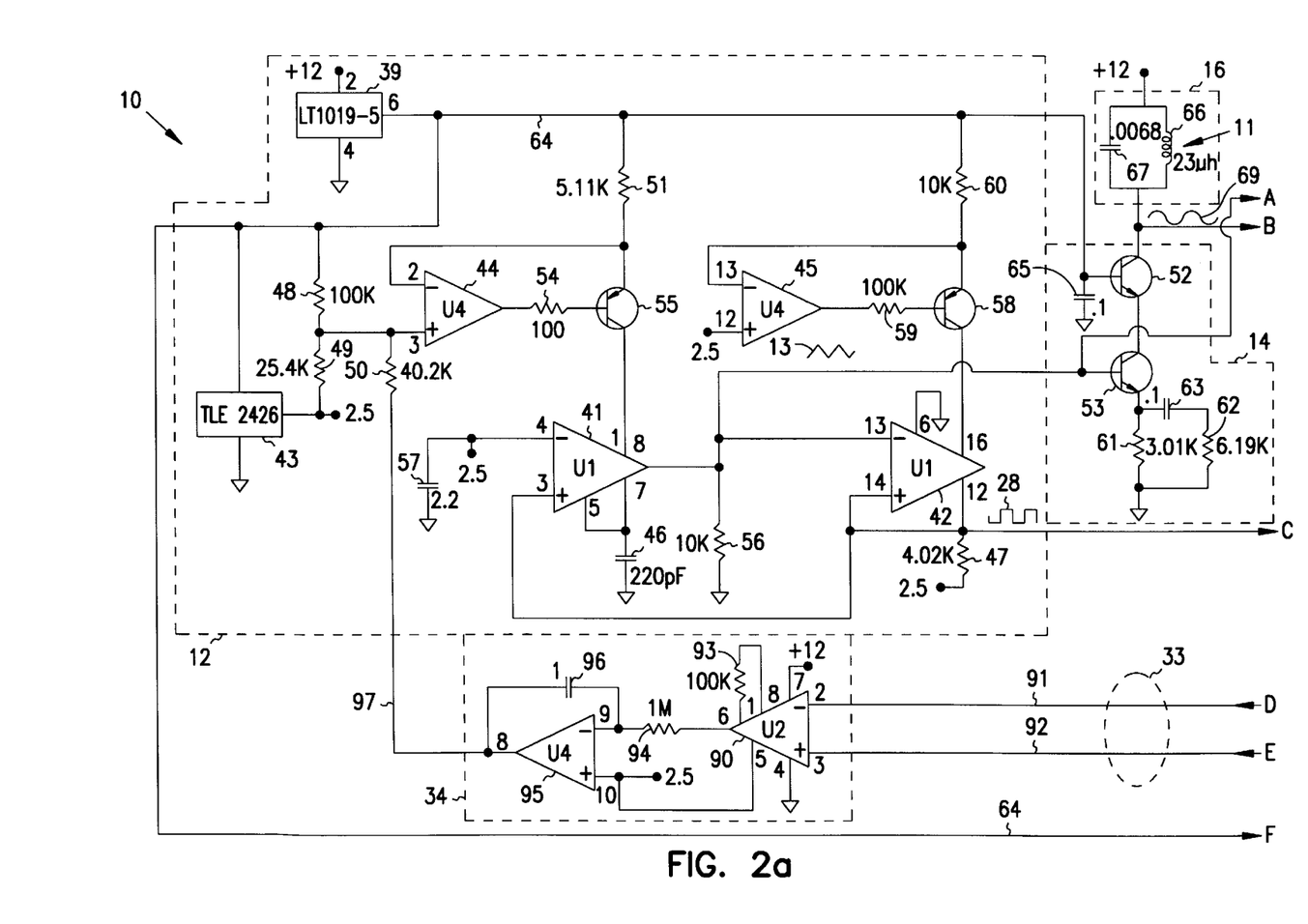
FIGS. 2a and 2b reveal circuits of the block diagram of FIG. 1.
Figure 2B:
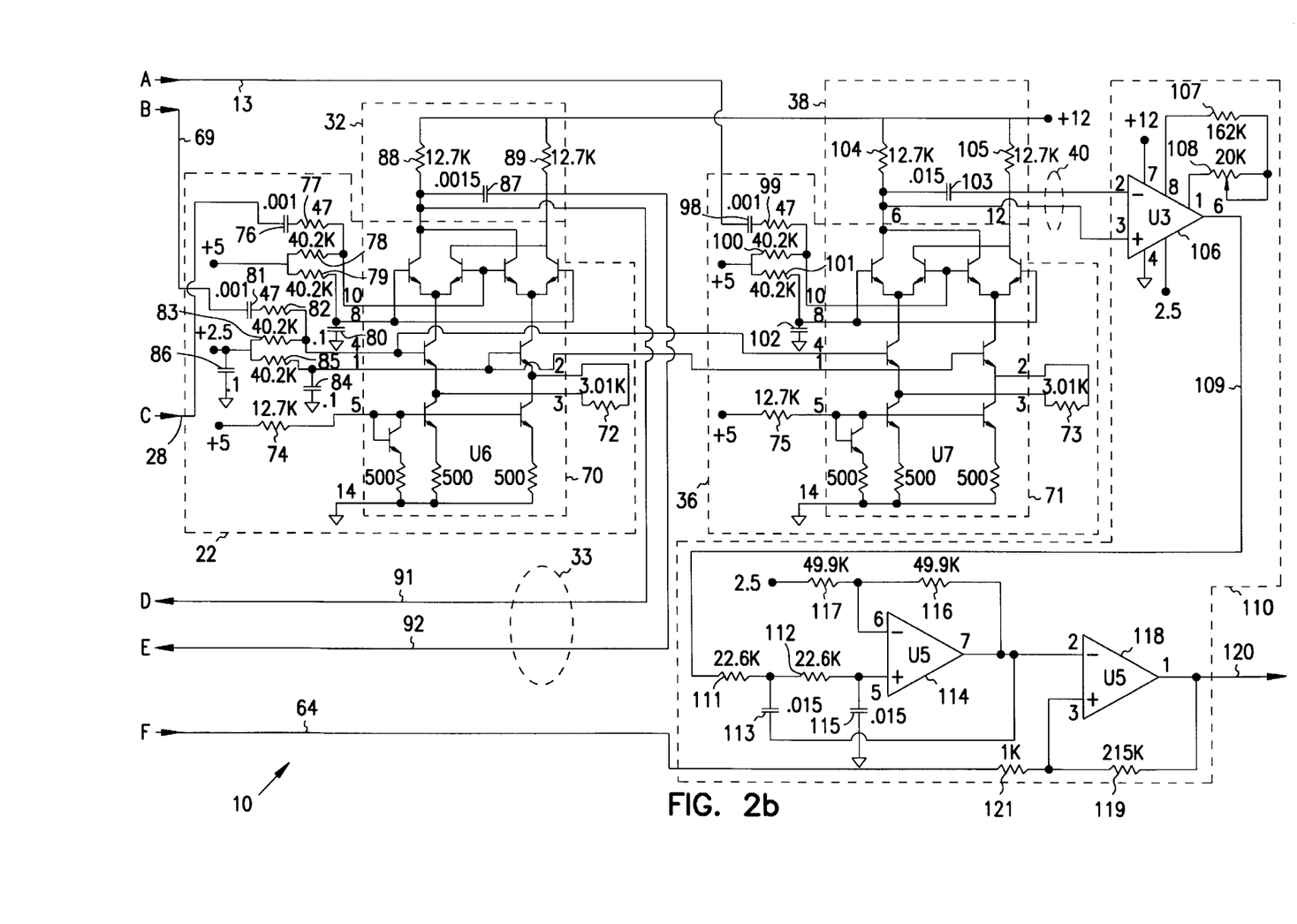

FIGS. 2a and 2b provide circuit details of proximity sensor system 10. In FIG. 2a, voltage controlled oscillator (VCO) 12 circuit consists of a voltage reference 39 (LT1019-5), dual transconductance amplifiers 41 and 42 (U1, LM13600), an instrumentation amplifier (U2, AMP04), a +2.5 VDC virtual ground or power supply splitter 43 (TLE2426), and two operational amplifiers 44 and 45 (U4, LMC6464). Suppose that the input at pin 3 of amplifier 41 is at a voltage that is significantly greater than 2.5 volts. This differential voltage will cause the current that flows into pin 1 to be mirrored and sourced into a 220 picofarad (pF) capacitor 46. Unless otherwise indicated in FIGS. 2a and 2b, all capacitor values are in microfarads ($\mu$F) and resistor values are in ohms. Terminals with numbers 2.5, 5, 12 refer to volts. "2.5" is from device 43. The current into pin 1 of transconductance amplifier 41 is established by the voltage at pin 3 of amplifier 44, and the magnitude of the current is a voltage difference (i.e., 5 volt reference minus the voltage at pin 3 of amplifier 44) divided by the 5.11 K ohm resistance of resistor 51. As this current is sourced into 220 picofarad capacitor 46, the voltage across capacitor 46 will increase linearly. A buffered version of this voltage is available on pin 8 of amplifier 41. Meanwhile, a fixed current is sourced into pin 16 of amplifier 42 and, since the voltage that is ramping upward is still less than the voltage at pins 3 and 14 of amplifiers 41 and 42, the differential input at pins 13 and 14 of amplifier 42 is such as to cause the fixed current to be mirrored and sourced into a 4.02 K ohm resistor 47. The voltage developed across 4.02 K ohm resistor 47 is therefore the 2.5 volt supply plus the 0.5 volt that is developed across 4.02 K ohm resistor 47—giving a total of three volts. The voltage continues to ramp upwards until the voltage at pin 13 of amplifier 42 becomes greater than 3 volts. At this point, the mirrored current from pin 16 of amplifier 42 reverses direction in 4.02 K ohm resistor 47, so the voltage at pins 3 and 14 of amplifiers 41 and 42 drops to 2 volts. Note that the voltage at pin 14 is also used to determine which way the mirrored current from pin 16 flows, so there is positive feedback at the instant of switching because the threshold is moving. In other words, this is a Schmitt trigger. Since the input at pin 3 of amplifier 41 has now switched from 3 volts to 2 volts, the direction of the current that is mirrored from pin 1 reverses, as does the triangle wave's slope. The voltage at the buffered output (pin 8) of amplifier 41 thus proceeds to ramp downward until it gets to 2 volts, as which time the regenerative action reacts in the opposite direction and starts the triangle wave back on the ascending part of its journey. One is now back to the place when the explanation began; so the whole cycle repeats endlessly and one has an oscillator. The slope of the triangle wave depends on the magnitude of the current that is sourced into pin 1 of amplifier 41 and this magnitude depends on the voltage at pin 3 of amplifier 44. This voltage is created both by means of a fixed bias network of 100 K ohm resistor 48 and 25.4 K ohm resistor 49, and by the influence of the output of an integrator 34 via 40.2 K ohm resistor 50. In addition to the triangle wave signal 13 output at pin 8 of amplifier 41, the square wave signal 28 at pin 12 of amplifier 42 is an output that is 90 degrees out of phase with triangle wave signal 13. This latter-described portion of the circuit provides a quadrature signal 28 that goes to demodulator 22.

Other components facilitate VCO 12. The quadrature outputs are an intrinsic aspect of the oscillator's design. A 100 ohm resistor 54 connects the output at pin 1 of amplifier 44 to the base of a PNP transistor 55 to prevent transistor oscillations. The emitter of transistor 55 is connected to resistor 51 and pin 2 of amplifier 44. The collector of transistor 55 is connected to pin 1 of amplifier 41. Besides being connected to pin 13 of amplifier 42 and the base of transistor 53, pin 8 of amplifier 41 is connected to a 10 K ohm resistor 56 which in turn is connected to ground so that the buffer inside amplifier 41 is always sourcing (rather than sinking) current. A 2.2 microfarad capacitor 57 is connected between ground and pin 4 of amplifier 41 for noise reduction. Output pin 14 of amplifier 45 is connected to the base of a PNP transistor 58 via a 100 ohm resistor 59. The emitter of transistor 58 is connected to a 10 K ohm resistor 60. Resistor 60, like resistor 51, is connected to an output voltage line 64 of voltage reference device 39. The collector of transistor 58 is connected to pin 16 of amplifier 42. Transistors 55 and 58 function as current sources.

Two NPN transistors 52 and 53 constitute a high input impedance current pump or voltage-to-current converter 14 to drive resonant transducer or proximity sensor 16. Signal 13 from pin 8 of amplifier 41 goes to the base of transistor 53. The bias circuit is simple because it is connected to the output signal 13 that is ramping back and forth between 2 and 3 volts while a reasonably stable current is established by dropping 2 volts across a 3.01 K ohm emitter resistor 61. A 6.19 K ohm resistor 62, coupled by a 0.1 micro farad capacitor 63, allows the AC current to be a large fraction of the DC current in spite of the fact that the AC component of input signal 13 is a small fraction of the DC component. The collector of transistor 53 is connected to the emitter of transistor 52. The base of transistor 52 is connected to a 0.1 microfarad capacitor 65 and to voltage line 64. The collector of transistor 52 is connected to resonant transducer 16, which consists of a 0.0068 microfarad capacitor 67 and a 23 micro henry inductor 66. The other ends of inductor 66 and capacitor 67 are connected to a 12 VDC source. The voltage that is developed across resonant transducer or proximity sensor 16 is a sinusoidal signal 69 in spite of sensor 16 being driven from a triangle wave, and sinusoidal signal 69 then goes to demodulators 70 and 71. Triangular signal 13 goes to demodulator 71 and square wave signal 28 goes to demodulator 70.

Figure 3:
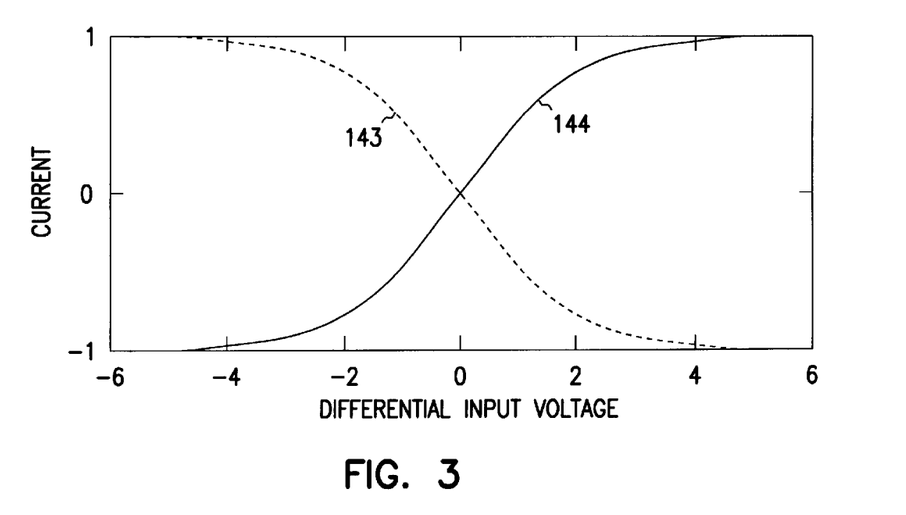
FIG. 3 is a plot of output current versus differential input voltage to a differential amplifier used in the present system.

Devices 70 (U6) and 71 (U7) are two LM1496 balanced modulator/demodulator chips. The bias current in these chips 70 and 71 is set by the current flowing into pin 5 and this current, together with the value (e.g., 3.01 K ohms) of the emitter degeneration resistors 72 and 73 between pins 2 and 3, set the gain in the signal channel of the respective demodulators 70 and 71. Pins 5 of chips 70 and 71 are connected to +5 VDC via 12.7 K ohm resistors 74 and 75, respectively. Although no accurate quantitative measurement of the gain was made, the transfer function of the differential pair in the signal channel is known to be similar to that shown in FIG. 3 because increasing the amplitude of the triangle wave would cause distortion that is characteristic of the differential pair at higher drive levels. FIG. 3 is a plot of the normalized output current as a function of the differential input voltage to the signal channel of the LM1496. Curve 143 represents the inverting input and curve 144 represents the non-inverting input of devices 70 and 71 using LM1496 chips.

Since the carrier channels (pins 8 and 10) of devices 70 and 71 do not have emitter degeneration resistors, these pin pairs will switch almost completely with voltages as low as 100 mV. Square wave signal 28 goes to pins 8 and 10 of demodulator (or multiplier) 70 via a resistor-capacitor network. Signal 28 goes in one end of a 0.001 microfarad capacitor 76. The other end is connected to a 47 ohm resistor 77 that is connected to pin 10 of device 70. Also connected to this pin 10 is a 40.2 K ohm resistor 78 that is connected to +5 VDC. Another 40.2 K ohm resistor 79 connects pin 8 of device 70 to +5 VDC. A 0.1 microfarad capacitor 80 is connected between this pin 8 and ground.

Sine wave 69 goes to pins 4 and 1 of device 70 via a resistor-capacitor network. Signal 69 goes to a 0.001 microfarad capacitor 81 that is connected to a 47 ohm resistor 82. Resistor 82 is connected to pin 4 of device 70. Also, this pin 4 is connected to a 40.2 K ohm resistor 83 which is connected to +2.5 VDC of power supply splitter 43 which provides all of the +2.5 VDC sources for the circuits of device 10. Pin 1 of device 70 is connected to a 0.1 microfarad capacitor 84 that connected to ground. This pin 1 is connected to a 40.2 K ohm resistor 85 that is connected with resistor 83 to +2.5 VDC. The ends of resistors 83 and 85 connected to the +2.5 VDC are also connected to a 0.1 microfarad capacitor 86 that is connected to ground. Pin 14 of device 70 is also connected to ground.

The output at pins 6 and 12 of chip 70 go to a low pass network 32. A 0.0015 microfarad capacitor 87 is connected across these pins 6 and 12. A 12.7 K ohm resistor 88 is connected between pin 6 and +12 VDC. A 12.7 K ohm resistor 89 is connected between pin 12 and +12 VDC. The output of device 70 goes from pins 6 and 12 via lines 91 and 92 to pins 2 and 3, respectively, of difference amplifier 90 (U2, AMP04) of integrator 34. Amplifier 90 has a 100 K ohm resistor 93 connected across pins 1 and 8. Output pin 6 of amplifier 90 is connected to a one megohm resistor 94 which goes to inverting input pin 9 of amplifier 95 (U4, LMC6464). Pin 5 of amplifier 90 and pin 10 of amplifier 95 are connected to +2.5 VDC. A one microfarad capacitor 96 connects output pin 8 to input pin 9 of amplifier 95. At pin 8 is an output 97 of integrator 34, which goes to input pin 3 of amplifier 44 in VCO 12 via resistor 50.

Both of the differential voltage inputs are bipolar, so the demodulators are four-quadrant demodulators. The inputs to demodulator 70 consist of sinusoidal signal 69 from resonator 16 (signal channel) and square wave 28 from oscillator 12 (carrier channel). If the VCO 12 frequency is on resonance, then sine wave 69 across resonator 16 will be in phase with triangle wave 13 to current pump 14, so sine wave 69 will be in a quadrature phase relationship with square wave 28.

The AC component at the output of demodulator 70 is a differential signal that is largely filtered out by 0.0015 microfarad capacitor 87 working against load resistors 88 and 89. The differential DC components are amplified by instrumentation amplifier 90 and converted to a single-ended signal that is referred to the +2.5 volt supply voltage that may be referred to as a virtual ground. Since the waveforms 28 and 69 are in quadrature on resonance, there is no DC component and the output of instrumentation amplifier 90 is also at +2.5 volts from device 43 and the integrator's output 97 does not move. If VCO 12 is not on resonance, the phase angle between sine wave 13 and square wave 28 deviates from 90 degrees in such a direction as to create a signal which drives output 97 of integrator 34 to the voltage needed to change the frequency of VCO 12 to the resonant frequency. A one megohm resistor 94 and a one micro farad capacitor 96 in integrator 34 will not allow the integrator to respond rapidly enough to follow the change in the resonance frequency that occurs when a train wheel goes by at high speed, so the output of other demodulator 71 will drop both because the Q of resonator 16 decreases and becomes mis-tuned. This, of course, is what is meant by slow resonance tracking.

Signal 13 goes to pins 8 and 10 of demodulator (or multiplier) 71 via a resistor-capacitor network. A 0.001 microfarad capacitor 98 has one end connected to output pin 8 of amplifier 41 and the other end to a 47 ohm resistor 99. Resistor 99 is connected to pin 10 and a 40.2 K ohm resistor 100. Resistor 100 is connected to +5 VDC and to a 40.2 K ohm resistor 101. The other end of resistor 101 is connected to pin 8. A 0.1 microfarad capacitor 102 connects pin 8 to ground. Pins 1 and 4 of chip 71 are connected to pins 1 and 4 of chip 70, respectively.

The output at pins 6 and 12 go to low pass network 38. A 0.015 microfarad capacitor 103 is connected across these pins 6 and 12. A 12.7 K ohm resistor 104 is connected between pin 6 and +12 VDC. A 12.7 K ohm resistor 105 is connected between pin 12 and +12 VDC. Pin 6 is connected to non-inverting input pin 3 of an instrumentation amplifier 106 (U3, AMP04) which is a part of threshold detector 110. Pin 12 is connected to inverting input pin 2 of amplifier 106. A 162 K ohm resistor 107 and a 20 K ohm potentiometer 108 are connected in series across pins 8 and 1 of amplifier 106.

An output 109, from pin 6 of amplifier 106 goes to a 22.6 K ohm resistor 111 which is connected to a 22.6 K ohm resistor 112 and a 0.015 micro farad capacitor 113. Resistor 112 is connected to non-inverting pin 5 and capacitor 113 is connected to output pin 7 of operational amplifier 114 (U5, LMC6484).

A 0.015 microfarad capacitor 115 connects pin 5 to ground. A 49.9 K ohm resistor 116 connects pin 7 to inverting input pin 6 of amplifier 114. A 49.9 K ohm resistor 117 connects this pin 6 to +2.5 VDC. Output pin 7 of amplifier 114 is connected to inverting input pin 2 of an operational amplifier 118 (U5, LMC6484). Pin 1 is connected via a 215 K ohm resistor 119 to a non-inverting input pin 3 of amplifier 118. This pin 3 is also connected to a 1.0 K ohm resistor 121 that is connected to line 64 of voltage reference 39. Pin 1 constitutes an output 120 for threshold detector 110 of sensor system 10.

Demodulator 71 uses sine wave 69 in the signal channel and triangle wave 13 in the carrier channel to derive a DC level that is indicative of the magnitude of the signal across resonator 16. This DC level is then amplified by second instrumentation amplifier 106 and the subsequent low pass filter at amplifier 114 (pins 5, 6, and 7). Once amplified, the signal at the output pin 7 of amplifier 114 will be greater than 5 volts when no target is present; so the operational amplifier that serves as comparator 118, which compares the signal to a +5 volt reference level, will have output at ground. For a target indication, the output will be several volts. Potentiometer 108 may be adjusted to determine the sensing distance of sensor 16. The use of an operational amplifier as comparator 118 works well because one needs neither the speed nor the problems of conventional comparators. An appropriate amount of hysteresis is used and the hysteresis is stable because the LMC6484 of amplifier 118 has a rail-to-rail output.

Figure 4:
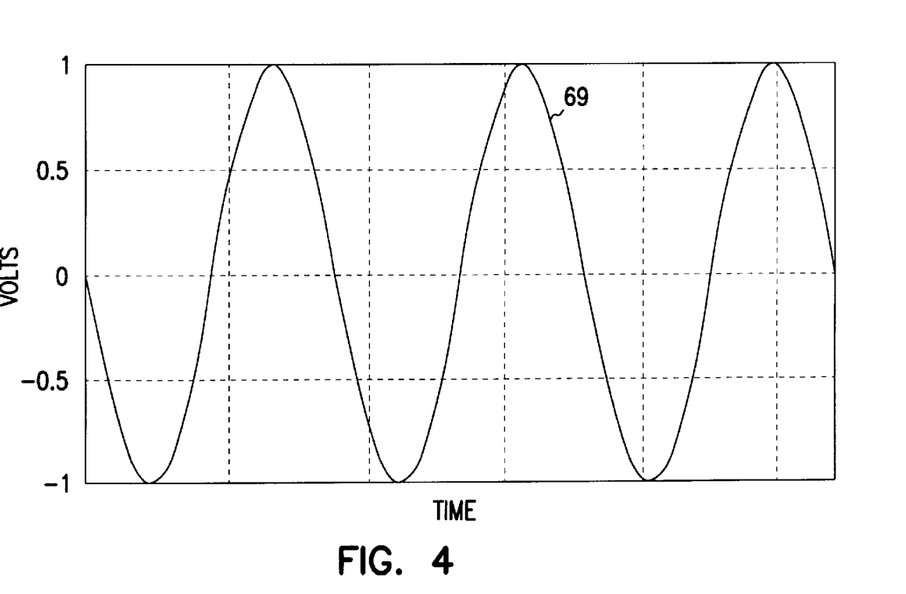
FIG. 4 is a plot of the voltage across the sensor.
Figure 5:
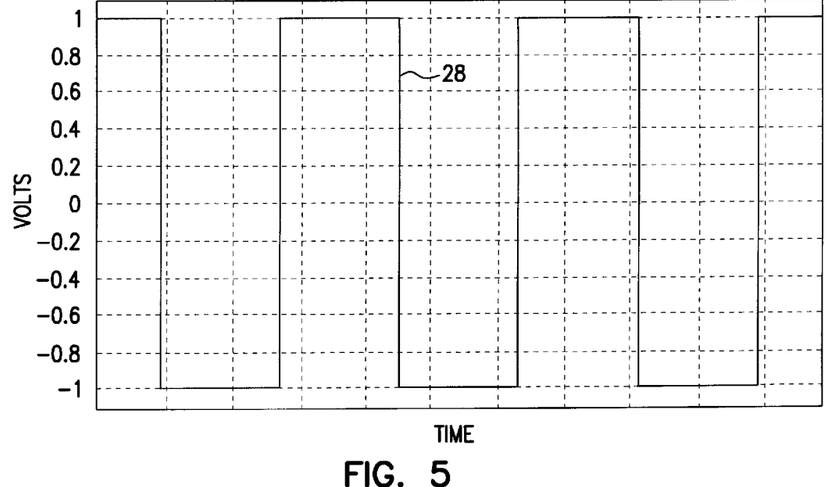
FIG. 5 is a plot of a square wave 90 degrees out of phase with the sine wave in FIG. 4.
Figure 6:
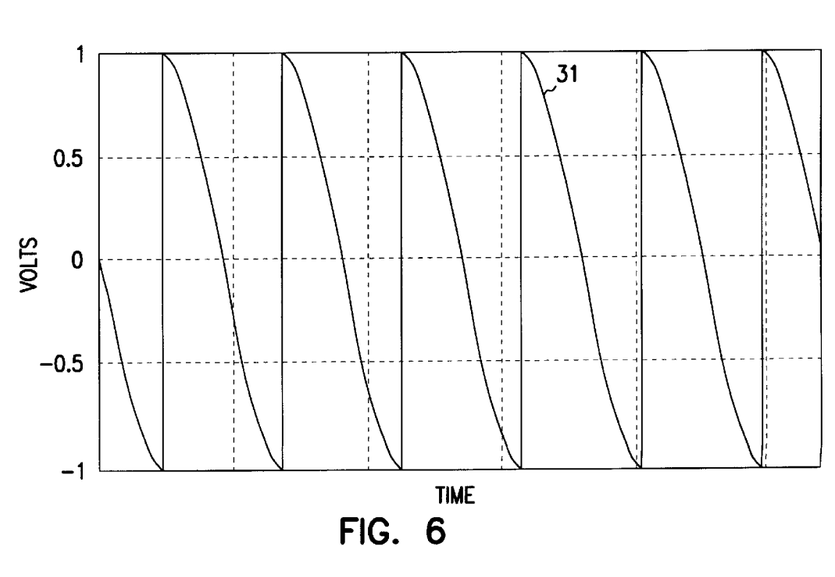
FIG. 6 shows a voltage signal that represents the product of the square wave and proximity sensor output, when the system is in resonance.
Figure 7:
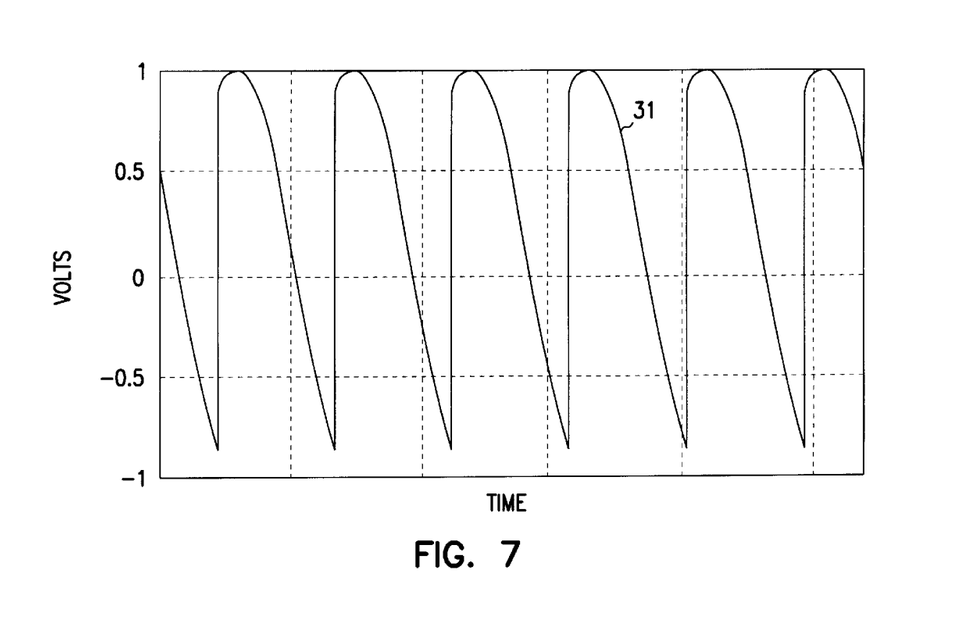
FIG. 7 is a representation of the voltage signal that represents the product of the square wave and proximity sensor outputs, when the system is not in resonance.

If the output of oscillator 12 is $\sin(\omega t)$, then signal 69 is $\sin(\omega t+\pi/2)$, as seen in FIG. 4. The waveforms in FIGS. 4 through 8 illustrate the principle and do not represent the actual magnitudes or frequencies used. This is with $\omega=1$ and no noise. Output 69 of sensor 16 is multiplied by a square-wave signal 28 of the oscillator's output. The signal 28 from VCO 12 is a square wave that is 90 degrees out of phase with signal 13 that is used to drive sensor 16. Signal 28 is shown in FIG. 5. VCO 12 produces triangle wave 13 and square wave 28 that are 90 degrees out of phase because the square wave changes levels when the triangle wave is at its peaks. The quadrature signal (square wave) can be generated in a plurality of ways to produce signal 28. The input signals 28 and 69 to demodulator 22 are 90 degrees out of phase relative to each other. Resultant or product waveform 31 of quadrature waveforms 28 and 69 has no DC component at resonance. This can be seen in FIG. 6, a plot of the product of waveforms 28 and 69 in FIGS. 4 and 5. Their product has no DC components. This is in contrast to FIG. 7 which is a plot of the waveforms 28 and 69 in FIG. 5 and $\sin(\omega t+5\pi/6)$, again with $\omega=1$, when sensor 16 is not in resonance.

Signal 31 is sent through a low-pass filter 32 that filters any residue from interfering signals 11 to let only DC components through. A typical cut-off frequency for filter 32 is 300 Hz. DC signal 33 is output from 32 and goes to integrator 34 to be integrated. Integrator 34 integrates signal 33 coming from filter 32. In the case of resonance, the product of signals 28 and 69 contain no DC components, so it does not cause the output 97 of integrator 34 to change. Therefore, oscillator 12 does not change the frequency of its output signal 13 and sensor 16 stays in resonance.

If, on the other hand, VCO 12 is not running at the resonant frequency of sensor 16, a DC component is generated at the output of demodulator 22 and resultant signal 97 causes the frequency of VCO 12 to move to the resonant frequency. This DC signal, as indicated by the upward shift in the DC level of waveform 31, can be seen in FIG. 7, a non-resonant situation. The phase difference between signals 28 and 69 multiplied to produce this trace 31 was 60 degrees.

Since this control loop forces oscillator 12 to maintain an anti-phase relationship between its signal 13 and output 69 of sensor 16, oscillator output 13 can be used to synchronously demodulate signal 69 at device 36. This demodulation output 37, along with the resonance-tracking control loop, implements a lock-in-amplifier (LIA) loop, which incorporates VCO 12 and demodulator 70. This amplifier looks specifically for a signal that is at a particular frequency. It looks for the frequency of VCO 12. The action of the integrator is to make the VCO frequency the same as the resonance frequency, but the lock-in-amplifier always looks for the signal that has the frequency of the frequency of the reference signal. In conjunction with demodulator 71 and a second low-pass filter 38, which filters signal 37, the LIA effectively translates the impedance of sensor 16 (at the resonant frequency) into a DC voltage 40.

Figure 8:
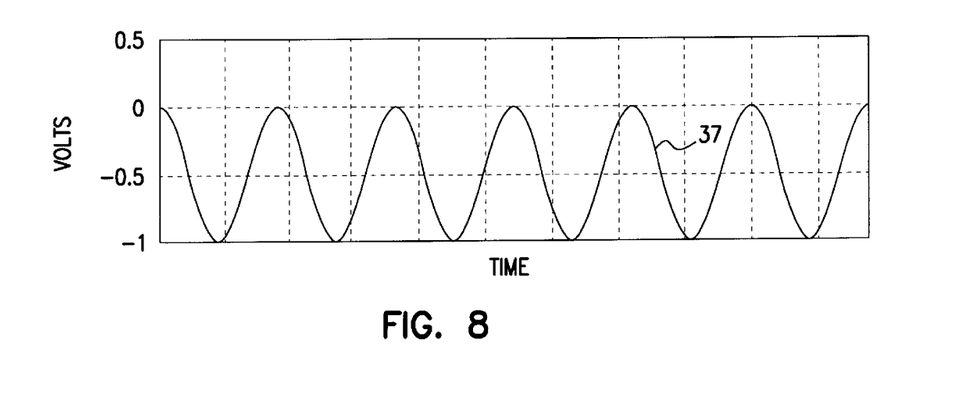
FIG. 8 shows a voltage signal that represents the product of the VCO and proximity sensor outputs, when the system is in resonance.

The effect of this demodulation can be seen in FIG. 8, where triangle wave 13 is shown as a sine wave because this is easier to do. FIG. 8 shows $\sin(\omega t)*\sin(\omega t)$, signal 37, in a resonant situation. The DC component of trace 37 depends on the impedance of resonant sensor 16. The presence of a target changes the impedance of resonant sensor 16 and thus also changes the DC component of trace 37. A Schmitt trigger circuit or like-circuit can then be used to convert DC voltage 40 into a logic-level indication of whether the target is near or far from the sensor.

Figure 9:
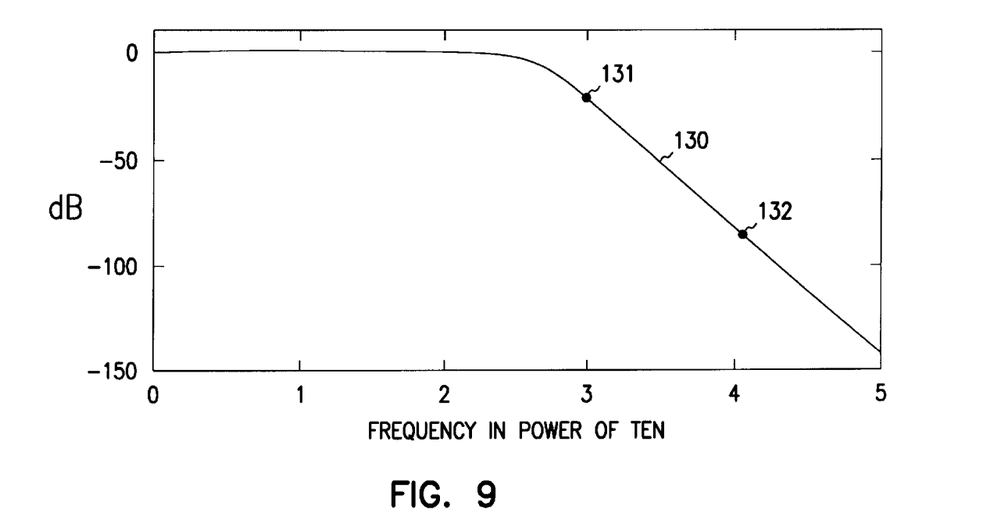
FIG. 9 is a Bode plot showing the attenuation of the third-order, Bessel low-pass filter.
Figure 10:
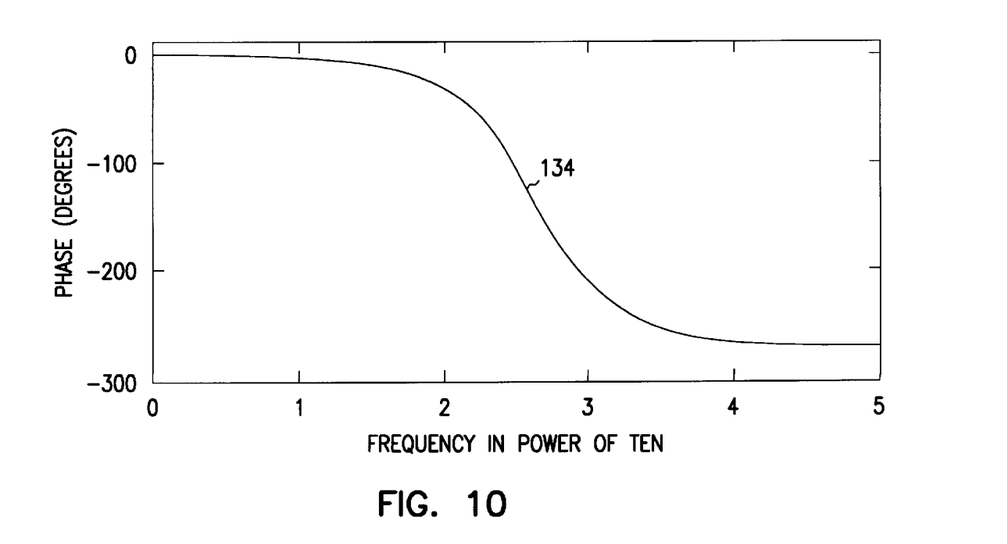
FIG. 10 is a Bode plot showing the phase response of the third-order, Bessel low-pass filter.
Figure 11:
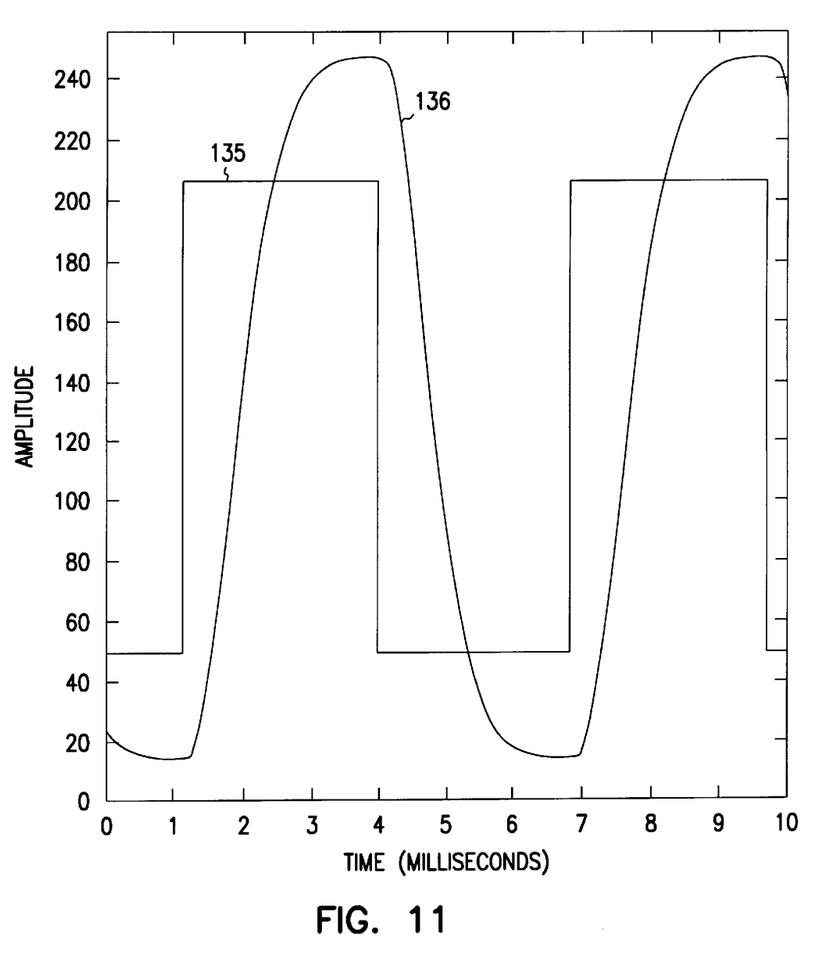
FIG. 11 shows the signals going in and out of the third-order, Bessel low-pass filter.

Since the LIA's ability to reject unwanted signals depends largely on filter 38 that is used at the output of synchronous demodulator 36, the characteristics of this filter are shown in FIGS. 9 through 11. FIG. 9 shows the amplitude response and FIG. 10 shows the phase response. FIG. 11 shows the response of filter 38 to a three-millisecond rectangular pulse.

In plot 130 of FIG. 9, the vertical axis shows the attenuation (dB) of 3rd-order Bessel low-pass filter 38, and the horizontal axis shows the power of ten of the frequency. The frequency range therefore extends from 1 Hz to 100,000 Hz. The attenuation between points 131 and 132 is about 60 dB per order of magnitude of frequency. This plot was generated by an analysis. Low-pass filter 38 has a cut-off frequency of about 150 Hz.

In plot 134 of FIG. 10, the vertical axis shows the phase (degrees) of the same 3rd-order Bessel low-pass filter, and the horizontal axis shows the power of ten of the frequency. The frequency range is still 1 Hz to 100,000 Hz. This plot was generated by an analysis also. This information is of interest because, overall, a 3rd-order filter is used after demodulator 71 since a second order filter within threshold detector 110, along with first-order filter 32, is incorporated.

In the plot of FIG. 11, the vertical axis shows amplitudes of the signals going into and out of a Bessel low-pass filter.

This filter shows some gain because the sensitivities of the two channels on the oscilloscope were not the same; so the vertical scale can be considered arbitrary. These plots 135 and 136 show how a 3rd-order Bessel filter responds to an input 135. The horizontal scale is time (milliseconds). The filter involves sensing an event or pulse that lasts as little as two milliseconds and that might not be rectangular, so one may want to increase the bandwidth of this filter to reduce the response time. The filter was designed to have a delay of one millisecond for frequencies throughout the pass band. Note that the delays of higher-order Bessel filters are distinct from their rise times; a sixth-order filter of comparable bandwidth has a similar rise time, but the entire event occurs later at the output. In sensor system 10, it does not matter if a target or wheel is counted five milliseconds after it passes.

Figure 12:
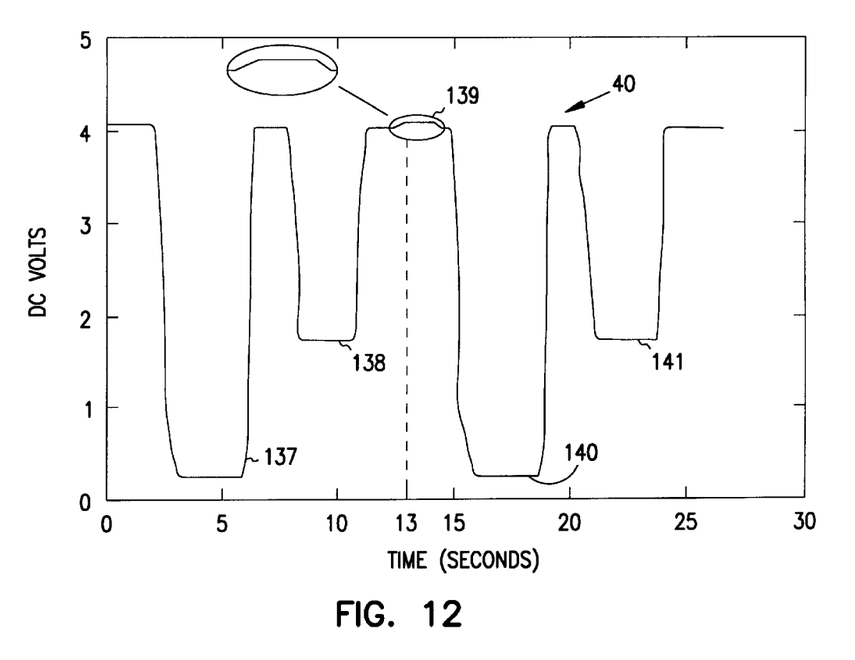
FIG. 12 reveals the effects of various targets on the system.

FIG. 12 shows a DC output 40 of amplifier 106 when there is no target present, when there is a vise (ferrous material) resting on sensor 16, and when there is a piece of aluminum resting on sensor 16. The vertical axis shows DC output 40 of amplifier 106 (volts) and the horizontal axis is time (seconds). This DC output is shown because it is more informative than the digital output that comes from comparator 118. These three conditions are shown first when the interfering signal (250 kHz) is a current that is 2.5 times larger than current signal 69 that is used to examine the resonance (0–13 seconds). Then these three conditions are repeated when the noise-to-signal ratio is increased to 75 (13–25 seconds).

The plot begins with the targets far from sensor 16 and with a 250 kHz interfering signal 11 that is 2.5 times larger than signal 69. (The interfering frequency does not come this close to the resonator frequency, but the intention was to demonstrate that the interference could have some observable effect). A first dip 137 occurred when a vise was placed on sensor 16. A second dip 138 occurred when a piece of aluminum was placed on the sensor 16. In between the second and third dips, there is a slight change 139 in the level of the output when the targets were far from sensor 16. Change 139 was the result of increasing the interference 11 signal to a level that was 75 times larger than signal 69. The remaining two dips 140 and 141 were the effects of the vise and the aluminum with this increased level of interference 11 present. The slight change in the DC level of signal 40 at the thirteenth second was the only observable effect.

Figure 13:
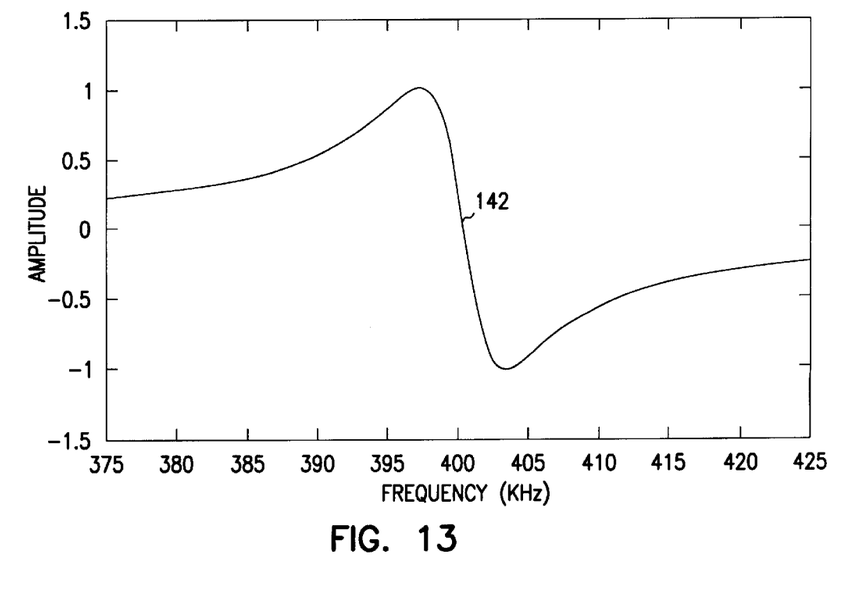
FIG. 13 is a plot of the discriminant of the resonance-tracking control loop.

FIG. 13 shows the calculated discriminant 142 used in the resonance-tracking control loop when the center frequency is 400 kHz and the Q is 67.

An interesting consideration involves the response time of the control system that is tracking the resonance. There are fundamentally three different situations involved because one is dealing with a circuit that is potentially non-linear. This non-linearity manifests itself as a classic discriminator curve that starts at zero, rises to a maximum, falls through zero to a minimum, and then returns to zero as in discriminant 142. To generate the discriminant's maximum level, oscillator 12 has to be off resonance enough to bring the phases of the two signals 28 and 69 together but not so far off that the level of discriminant 142 drops off because the magnitude of signal 69 diminishes. When far from the resonance, the level of discriminant 142 follows the magnitude of signal 69 toward zero. There are three situations. First, the frequency of the resonance shifts so little when a target is present that no appreciable error will arise in the output of circuit 38 even if the oscillator 12 frequency does not change at all.

Second, the frequency of the resonance shifts by an amount that does not cause an excursion beyond the linear part of discriminant 142. Third, the frequency of the resonance shifts dramatically to a position on the discriminant 142 that is beyond the maximum or minimum.

These situations are of interest because there are two ways that an interfering signal 11 can potentially cause errors. The first is that it could create a voltage waveform across resonator 16 that exceeds the signal handling capability of demodulator 36. This error is comparatively uninteresting and it can be avoided by proper design of the dynamic reserve of the LIA. The second effect is that the interfering signal 11 could cause the control system to mis-track the resonance, in which case an error in the amplitude of the output 40 would arise due to a phase error in the synchronous demodulator 36. Preventing this error entails understanding which of the three situations one is dealing with and designing the dynamic response of the control system to minimize the combined effect from these two sources of errors.

In the first situation, oscillator 12 has to find the resonance when circuit 10 is powered up, but it does not have to move in response to a wheel rolling past sensor 16. In this case, the control system for the VCO frequency can have a very low bandwidth, making it immune to effects of interference 11.

In the second situation, control system 10 has to track the change in the resonant frequency, so it needs to have a bandwidth comparable to that of filter 32 that filters the signal from demodulator 22. The circuit still behaves linearly, so conventional linear control system theory is applicable. The main concern involves designing an adequate filter 22 that does not destabilize the control loop of which it is a part.

In the third situation, one has a non-linear situation that is best avoided by proper design of both the Q of resonator 16 and the dynamics of control system 10.

Resonator 16 was operating at a frequency of 387 kHz and with a bandwidth of 5.74 kHz; so it had a Q of 67. The frequency increased to 429 kHz when the vise was placed on sensor 16 and to 505 kHz when the piece of aluminum was placed on sensor 16. These changes suggest that one will never experience the first situation unless the target remains sufficiently far from sensor 16. The maximum and minimum on discriminant 142 were 6 kHz apart, so the changes in frequency appear to suggest that one be faced with the third situation. This is not necessarily so because the situation arises only if the resonant frequency makes an excursion beyond the maximum or minimum of discriminant 142, but the location of the discriminant 142 changes as the control system tracks the resonance. Indeed, the horizontal axis of discriminant 142 is defined by the difference in the frequency of VCO 12 and the frequency of the resonance. One does not, therefore, have any particularly intractable problem to deal with in the optimization of a resonance-tracking impedance analyzer for resonance tracking proximity sensors 16.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A proximity sensor system having a resonance-tracking impedance analyzer for eliminating effects of interfering signals, comprising:

a voltage controlled oscillator;

a voltage-to-current converter connected to said voltage controlled oscillator;

a resonant circuit connected to said voltage-to-current converter;

a first demodulator connected to said resonant circuit and to said voltage controlled oscillator;

a second demodulator connected to said resonant circuit and to said voltage controlled oscillator;

a first filter connected to said first demodulator;

an integrator connected to said first filter and to said voltage controlled oscillator; and a second filter connected to said second demodulator.

2. The proximity sensor system of claim 1, wherein:

said resonant circuit is an inductive-capacitive circuit having an impedance that varies relative to proximity of a target; and said first and second filters are low pass filters.

3. The proximity sensor system of claim 2, further comprising a threshold detector connected to said second filter.

4. An interference tolerant proximity sensor system comprising:

a voltage controlled oscillator having an input, and first and second outputs;

a voltage-to-current converter having an input connected to the first output of said voltage controlled oscillator, and having an output;

a resonant circuit having a terminal connected to the output of said voltage-to-current converter;

a first multiplier having a first input connected to the second output of said voltage controlled oscillator, a second input connected to the terminal of said resonant circuit, and having an output;

a first filter having an input connected to the output of said first multiplier, and having an output;

an integrator having an input connected to the output of said first filter and having an output connected to the input of said voltage controlled oscillator;

a second multiplier having a first input connected to the first output of said voltage controlled oscillator, a second input connected to the terminal of said resonant circuit, and having an output; and a second filter having an input connected to the output of said second multiplier, and having an output.

5. The proximity sensor system of claim 4, wherein said first and second filter are low pass filters.

6. The proximity sensor system of claim 5, wherein said resonant circuit is an inductive-capacitive circuit having a resonant frequency.

7. The proximity sensor system of claim 6, wherein:

a first signal, from the first output of said voltage controlled oscillator and having a first frequency goes to the input of said voltage-to-current converter;

a second signal from said voltage-to-current converter goes to said resonant circuit;

the second signal, from the terminal of said resonant circuit and having the resonant frequency, goes to the second inputs of said first and second multipliers;

a third signal, from the second output of said signal voltage controlled oscillator, having the first frequency and an approximate quadrature phase relationship relative to the first signal, goes to the first input of said first multiplier;

a fourth signal, from the output of said first multiplier and having a DC magnitude representing a difference between the resonant frequency and the first frequency, goes to the input of said first filter;

a fifth signal, from the output of said first filter and having the DC magnitude, with AC components filtered out, goes to the input of said integrator; and a sixth signal, from the output of said integrator to the input of said voltage controlled oscillator and being a fifth signal that has been integrated, is a variable DC voltage that varies according to a magnitude of the DC magnitude of the fifth signal and the variable voltage adjusts the first frequency of the first and third signals to approximate the resonant frequency.

8. The proximity sensor system of claim 7, wherein:

the first signal goes to the first input of said second multiplier;

a seventh signal goes from the output of said second multiplier to the input of said second filter and has a DC voltage component which varies with an impedance of said resonant circuit, which in turn is affected by a proximity of a target;

said second filter removes much of an AC voltage component in the seventh signal, resulting in an eighth signal at the output of said second filter; and the eighth signal, a substantially DC voltage, has a magnitude that is at least partially determined by a distance of the target.

9. The proximity sensor system of claim 8, wherein:

the first signal approximates a triangular wave;

the second signal approximates a sinusoidal wave; and the third signal approximates a square wave.

10. The proximity sensor system of claim 9, further comprising a threshold detector, having an input connected to the output of said second filter, wherein the a ninth signal at the output of said threshold detector is a logic high or low depending on the magnitude of the eighth signal.

11. The proximity sensor system of claim 10, wherein the logic high is indicative of the target within a certain distance of said resonant circuit.

12. A means for interference tolerant proximity sensing, comprising:

means for providing a first waveform at a first frequency;

means for providing a second waveform in a quadrature phase relationship with the first waveform;

means for converting the first waveform into a current waveform;

means for target sensing, having a resonant circuit with a resonant frequency, which has an impedance that varies relative to a distance of a target from the resonant circuit;

feeding the current waveform into the resonant circuit, wherein the resonant circuit converts the current waveform into a voltage waveform across the impedance and at the resonant frequency;

means for multiplying the first waveform and the voltage waveform to provide a first resultant waveform having AC and DC components; and means for filtering out the AC component from the first resultant waveform to provide a first DC signal, which is indicative of the impedance of the resonant circuit.

13. The means of claim 12, further comprising:

means for multiplying the second waveform and the voltage waveform to provide a second resultant waveform having AC and DC components;

means for filtering out the AC component from the second resultant waveform to provide a second DC signal which has a magnitude that indicates a difference between the first and resonant frequencies; and means for integrating the second DC signal and outputting a control signal for changing the first frequency to approximately equal the resonant frequency.

14. The means of claim 13, wherein:

the first waveform is triangular;

the second waveform is square;

the voltage waveform is sinusoidal; and the resonant circuit is inductive-capacitive.

15. The means of claim 14, further comprising means for thresholding the first DC signal into a logic high or low signal.

16. The means of claim 15, wherein the logic high is indicative of the target within a certain distance of said resonant circuit.

17. A method for interference tolerant proximity sensing comprising:

generating a first waveform at a first frequency;

operating a second waveform having a quadrature phase relationship relative to the first waveform;

converting the first waveform into a current waveform;

converting the current waveform into a voltage waveform that varies in magnitude in response to an impedance in a resonant device that changes relative to distance of a target from the resonant device, wherein the voltage waveform has a resonant frequency;

multiplying the first waveform and the voltage waveform to produce a first resultant waveform having AC and DC components; and filtering out the AC component from the first resultant waveform to produce a first DC signal that indicates an amount of impedance in the resonant circuit.

18. The method of claim 17, further comprising:

multiplying the second waveform and the voltage waveform to produce a second resultant waveform having AC and DC components;

filtering out the AC component from the second resultant waveform to produce a second DC signal that has a magnitude representing a difference between the first and resonant frequencies; and integrating the second DC signal into a voltage control signal for changing the first frequency to approximately equal the resonant frequency.

19. The method of claim 18, wherein:

the first waveform is triangular;

the second waveform is square;

the voltage waveform is sinusoidal; and the resonant device is an inductive-capacitive circuit.

20. The method of claim 19, further comprising thresholding the first DC signal into a logic high or low signal.

21. The method of claim 20, wherein the logic high is indicative of the target within a certain distance of the resonant device.

* * * * *